US008503719B2

(12) United States Patent
Deschamps et al.

(10) Patent No.: US 8,503,719 B2
(45) Date of Patent: Aug. 6, 2013

(54) ARTICLE-PROCESSING DEVICE HAVING A SYSTEM FOR MONITORING THE QUALITY OF IMAGES OF THE ARTICLES IN REAL TIME, A SORTING MACHINE, AND A METHOD

(75) Inventors: Eric Deschamps, Saint Leu la Foret (FR); Christophe Caillon, Bretigny sur Orge (FR); Marc Dautain, Bretigny sur Orge (FR)

(73) Assignee: Solystic, Gentilly Cedex (FR)

( * ) Notice: Subject to any disclaimer, the term of this patent is extended or adjusted under 35 U.S.C. 154(b) by 40 days.

(21) Appl. No.: 13/142,123

(22) PCT Filed: Mar. 15, 2011

(86) PCT No.: PCT/FR2011/050520
§ 371 (c)(1),
(2), (4) Date: Jun. 24, 2011

(87) PCT Pub. No.: WO2011/124794
PCT Pub. Date: Oct. 13, 2011

(65) Prior Publication Data
US 2012/0057744 A1    Mar. 8, 2012

(30) Foreign Application Priority Data
Mar. 30, 2010 (FR) ..................... 10 52355

(51) Int. Cl.
G06K 9/00    (2006.01)
(52) U.S. Cl.
USPC ........................................................ 382/101
(58) Field of Classification Search
None
See application file for complete search history.

(56) References Cited

U.S. PATENT DOCUMENTS

| 5,878,156 A * | 3/1999 | Okumura ...................... 382/118 |
| 6,035,072 A * | 3/2000 | Read .............................. 382/275 |
| 6,081,608 A * | 6/2000 | Fujii et al. ..................... 382/112 |
| 7,027,934 B2 * | 4/2006 | Skeps et al. ..................... 702/35 |
| 2008/0015802 A1 * | 1/2008 | Urano et al. ..................... 702/81 |
| 2010/0182450 A1 * | 7/2010 | Kumar et al. .............. 348/229.1 |
| 2011/0187843 A1 * | 8/2011 | Johnson et al. ................. 348/76 |

FOREIGN PATENT DOCUMENTS
EP    0531229 A2    3/1993

OTHER PUBLICATIONS
Imatest, LLC, "Using blemish detect measure visible sensor defects," Jan. 2010, http://www.imatest.com/docs/blemish.html.

* cited by examiner

Primary Examiner — Stephen R Koziol
Assistant Examiner — Sean Conner
(74) Attorney, Agent, or Firm — Rothwell, Figg, Ernst & Manbeck, P.C.

(57) ABSTRACT

The invention relates to an article-processing device comprising a conveyor (2) for moving articles (1) in series and on edge, a camera (3) for taking a digital image (4) of each article (1), a data processor unit for performing processing on the pixels of the digital image (4), and means for inspecting/monitoring the quality of the digital images (4), said article-processing device being characterized in that:
  said conveyor has a back wall (9) of a dark color;
  said camera (3) takes a digital image (4) within which the article (1) lies against a background (7) corresponding to said back wall (9); and
  said inspection/monitoring means scan rows of pixels in order to extract, for each scanned row, a pixel having a light intensity extremum, and detect contrast indicative of degradation of the quality of the digital images (4).
The invention also relates to a sorting machine including such a device, and to an inspection/monitoring method.

7 Claims, 3 Drawing Sheets

ARTICLE-PROCESSING DEVICE HAVING A SYSTEM FOR MONITORING THE QUALITY OF IMAGES OF THE ARTICLES IN REAL TIME, A SORTING MACHINE, AND A METHOD

CROSS REFERENCE TO RELATED APPLICATION(S)

This application is a 35 U.S.C. §371 National Phase Entry Application from PCT/FR2011/050520, filed Mar. 15, 2011, designating the United States and also claims the benefit of French Application No. 1052355, filed Mar. 30, 2010, the disclosures of which are incorporated herein by reference in their entirety.

TECHNICAL FIELD

The invention relates to an article-processing device comprising a conveyor for moving articles in series and on edge, a camera facing transversely relative to the conveyor so as to take a digital image of each article, a data processor unit for performing processing on the pixels of the digital image of the article, and, in addition, means for inspecting/monitoring the quality of the images taken by the camera. The invention also relates to a postal sorting machine including such a device, and to a method of inspecting and monitoring the quality of the digital images for an article-processing device.

PRIOR ART

Such a device is more particularly designed for a postal sorting machine in which the performance of the sorting machine is directly dependent on the rate of automatic recognition of the delivery addresses on the mailpieces. The term "mailpiece" is used to mean any flat item of mail ranging from an ordinary letter to a magazine with or without a paper or plastics envelope or wrapper. Degradation in the quality of the images taken by the camera can, to a large extent, affect the rate of recognition of the delivery addresses on the mailpieces and thus the performance of the sorting machine. The term "camera" is used to mean a digital image acquisition system that is typically constituted by a Charge-Coupled Device (CCD) sensor associated with lenses, inside a housing, and coupled to a data processor unit, the focal plane of the lenses of the CCD sensor being oriented to view a transverse line at the foot of the letter or of the envelope, and said lenses also generally being protected by a transparent glass window or the like superposed on the housing.

Currently, by way of means for inspecting and monitoring the quality of the images taken by the camera, a system is provided that measures the instantaneous rate of automatic recognition of the addresses and the mean rate of automatic recognition of the addresses, and that triggers an alarm or indeed stops the sorting machine from operating if those measured parameters decrease considerably.

It is known, in particular from publication XP-002 640 864, that it is possible to provide a detector device for detecting lens defects by analyzing defects in the image that has passed through the lens. However, such devices do not make it possible to process articles such as mail items.

Current sorting machines are also provided with a display system for displaying, on a screen, successive images of the mailpieces that go past the camera for the purpose of having their quality visually inspected by an operator. The images are actually displayed on the screen in form of low-resolution thumbnails and the inspection is therefore not very reliable, and it can happen that the machine is used for a long time with degraded performance Publication EP 0 531 229 describes an automated document-orienting device including a pair of cameras disposed facing each other and on either side of the path of the documents, in order to take images of both faces of the documents. The images are stored in a memory before being subjected to subsequent processing making it possible to determine which way each passing document is facing and to orient it accordingly. Each camera takes images in strips or "slices", limited to each document, each slice having a width of 1 pixel and being converted individually into an electrical signal so as to be stored in the memory. The camera is suitable for determining difference in level of light intensity, in order to detect the presence of a document going past its lens. The image that is taken of the document is broken down into four reference zones of the document, for each of which the proportion of black pixels in each reference surface is counted. Comparison of the proportions of the four reference zones makes it possible to identify the zone(s) that bear(s) information and thus to determine which way the document being conveyed is facing. However, that device does not make it possible to take account of degradation in the digital images taken by the cameras.

SUMMARY OF THE INVENTION

An object of the invention is to remedy those drawbacks.

The invention stems from the observation that the performance of a postal sorting machine with an acquisition system for acquiring digital images of the mailpieces depends firstly on maintaining good image quality. In order to obtain images of good quality, it is necessary firstly to perform proper preventive maintenance of the image acquisition system, i.e. regular calibration of the optical system of the acquisition system with test cards, and it is necessary then to detect as early as possible the presence of any dirt facing the optical system of the image acquisition system, it being possible for such dirt to come from dust in the industrial environment of the system or indeed from traces of adhesive left by the mailpieces in closed or open envelopes on the optical system (i.e. on the transparent protective window) of the image acquisition system.

The invention thus provides an article-processing device comprising a conveyor for moving articles in series and on edge, a camera facing transversely relative to the conveyor so as to take a digital image of each article, a data processor unit for performing processing on the pixels of the digital image of the article, and, in addition, means for inspecting/monitoring the quality of the digital images taken by said camera, said article-processing device being characterized in that:

said conveyor has a back wall of a dark color and in front of which, relative to the camera, each article passes;

said camera is arranged to take a digital image within which the article lies against a background corresponding to said back wall of the conveyor, the digital image including both said background and the face of the article; and said inspection/monitoring means are arranged to scan rows of pixels in each digital image including pixels corresponding to said background in order to extract, for each scanned row, a pixel having a light intensity extremum, said inspection/monitoring means further being arranged to detect, from a plurality of digital images, contrast among said extracted pixels, such contrast being indicative of degradation of the quality of the digital images taken by said camera.

According to a feature of this device of the invention, said back wall is constituted by a face of a drive belt for driving the articles.

According to another feature of the device of the invention, said inspection/monitoring means are arranged to scan rows of pixels of the digital image in such a manner as to extract, from each scanned row, a pixel presenting a minimum level of light intensity and a pixel presenting a maximum level of light intensity, and said pixels extracted from a plurality of digital images are used to detect any degradation in the quality of the digital images taken by the camera.

Advantageously, the articles processed by the device are mailpieces.

The invention also provides a postal sorting machine including a device as described above.

The invention also provides a method of inspecting/monitoring, over time, the quality of the digital images taken by a camera for an article-processing device, the method comprising the following steps:

taking a digital image of an article using the camera in such manner that the article lies within and against a background of dark color, said digital image including both said background and a face of the article, and recording said digital image in a memory of a data processor unit;

scanning rows of pixels in the digital image including pixels corresponding to said background in order to extract, for each scanned row, light intensity extrema from the pixels of the digital image; and analyzing said extrema and detecting, on the basis of a plurality of digital images, contrast among said pixels extracted from said digital images so as to identify any degradation in the quality of the digital images.

Preferably, the rows of pixels of the digital image are scanned in such a manner as to extract, from each scanned line, a pixel presenting a minimum level of light intensity and a pixel presenting a maximum level of light intensity, and said pixels extracted from a plurality of digital images are used to detect any degradation in the quality of the digital images taken by the camera.

The arrangement of these inspection/monitoring means that monitor, in real time, variation in the intensity extrema of the pixels enables any degradation in performance of the image acquisition system to be detected very rapidly. In particular, in multi-level grayscale digital images, the two extrema correspond to white and to black. In an acquisition system that is adjusted nominally, the maximum grayscale level (corresponding to white) is close to 255 whereas the minimum grayscale level (corresponding to black) is close to 0. The principle of the inspection/monitoring system of the invention is to check, in real time, that the maximum and minimum levels of white and of black in the digital images do not drift over time relative to setpoint values, i.e. as digital images of successive mailpieces are acquired. The pixels having maximum light intensity are the digital image pixels that correspond to the faces of the mailpieces, which faces are generally white, while the pixels having minimum light intensity are the digital image pixels that correspond to the back wall of the conveyor that is advantageously a belt for driving the mailpieces and that has a face that is dark and preferably black.

BRIEF DESCRIPTION OF THE DRAWINGS

An embodiment of the device of the invention and an implementation of the method of the invention are described below with reference to the figures, in which.

DESCRIPTION OF EMBODIMENTS AND IMPLEMENTATION

Figure 1:
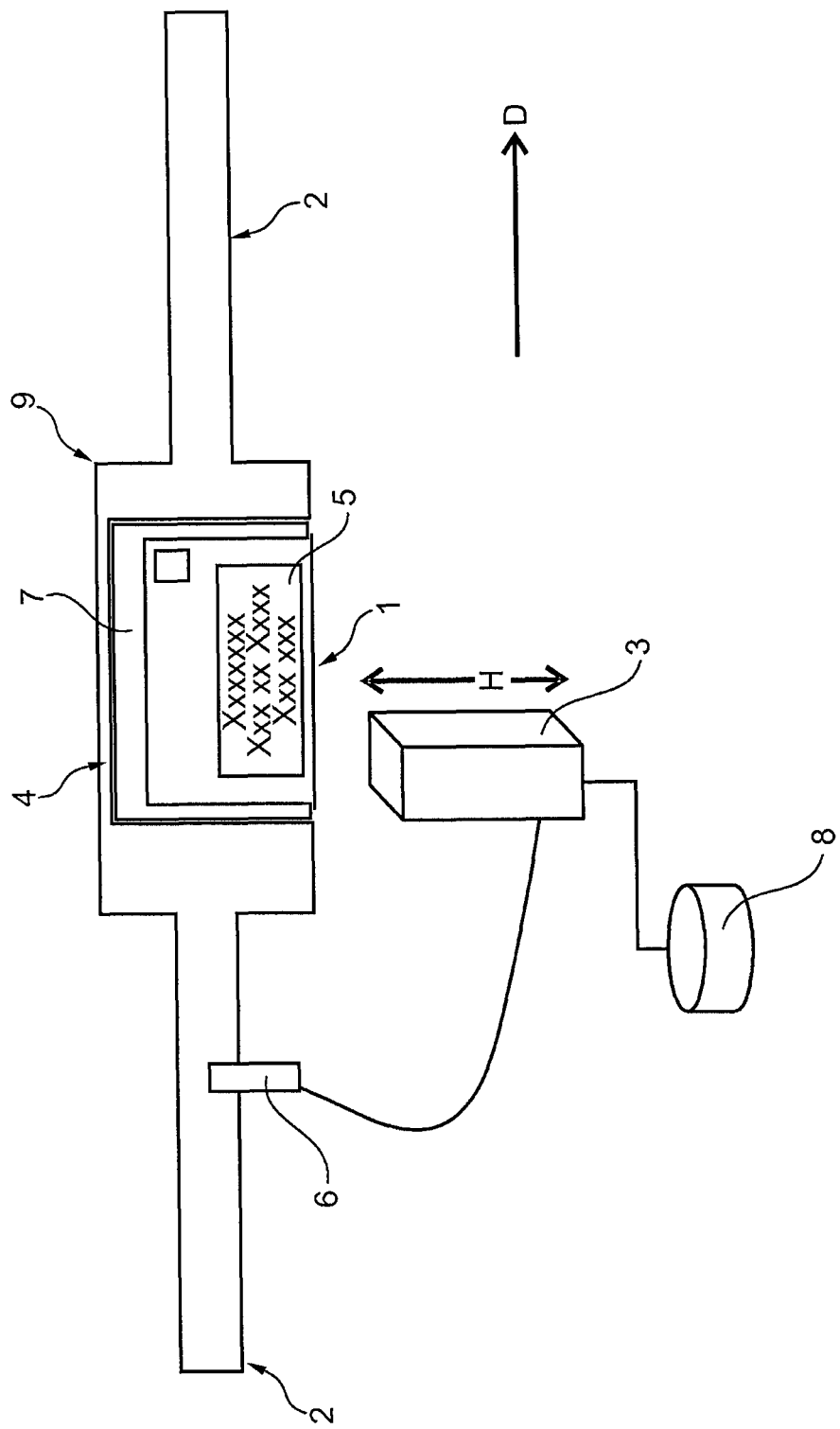
FIG. 1 is a highly diagrammatic view of a mailpiece-processing device including an image acquisition system for acquiring images of the mailpieces.

FIG. 1 shows a device for processing mailpieces such as 1 that are moved in series and on edge by a conveyor, which, in this example, is a belt conveyor 2, and which moves the mailpieces past a camera 3 serving to take a digital image 4 of each mailpiece (for reasons of simplicity, the image 4 corresponds to the mailpiece itself in this example), in particular with a view to performing recognition of the delivery address 5 on the face of the mailpiece in question.

It should be noted that the mailpiece-processing device shown in FIG. 1 is normally part of a larger facility such as a postal sorting machine having sorting outlets (not shown) to which the mailpieces are selectively directed as is well known.

The image of the face of each mailpiece that bears the address 5 is taken while the mailpiece is moving in the conveying direction D, and the focal plane of the camera 3 (i.e. of the CCD sensor with its lenses) extends over the entire height H of the mailpiece so that the image 4 is formed by scanning the mailpiece in the direction D after passage of the mailpiece has been detected by a passage sensor 6 placed upstream from the camera 3 in the direction D.

As shown in FIG. 1, in the image 4, the face of the mailpiece 1 that bears the address 5 lies within and against a background 7 of a dark and preferably black color and that corresponds to a back wall 9 of the conveyor that is disposed behind the mailpiece 1 relative to the camera 3. Said back wall 9 is advantageously another belt of the conveyor that co-operates with the belt 2 so as to drive mailpieces in the direction D by nipping them.

It should be noted that the back wall 9 may merely be a stationary plate that is painted black and on which the mailpieces slide.

Reference 3 in FIG. 1 designates not only a camera, i.e. an image acquisition system, but also a larger facility including a data processor unit with a memory 8 that, on the basis of a digital image acquired by the camera and stored in the memory 8, performs image processing for the purposes, in this example, firstly of recognizing the delivery address 5 on the face of the mailpiece by using Optical Character Recognition (OCR), and secondly of inspecting or monitoring in real time the quality of the images taken by the camera after a stage of calibrating the camera.

Camera calibration parameters are established during a maintenance operation performed on the image acquisition system 3. The maintenance operation performed on the image acquisition system consists, in particular, in calibrating the level of white and the level of black of the image pixels over the entire scanning height H of the camera by causing a white test card to go past the camera, followed by a black test card. On the basis of these test cards, linear correction coefficients are calculated so that the levels of intensity of white and of black of the pixels taken by the camera are uniform and respectively equal to 255 and 0 (saturation levels).

Figure 2:
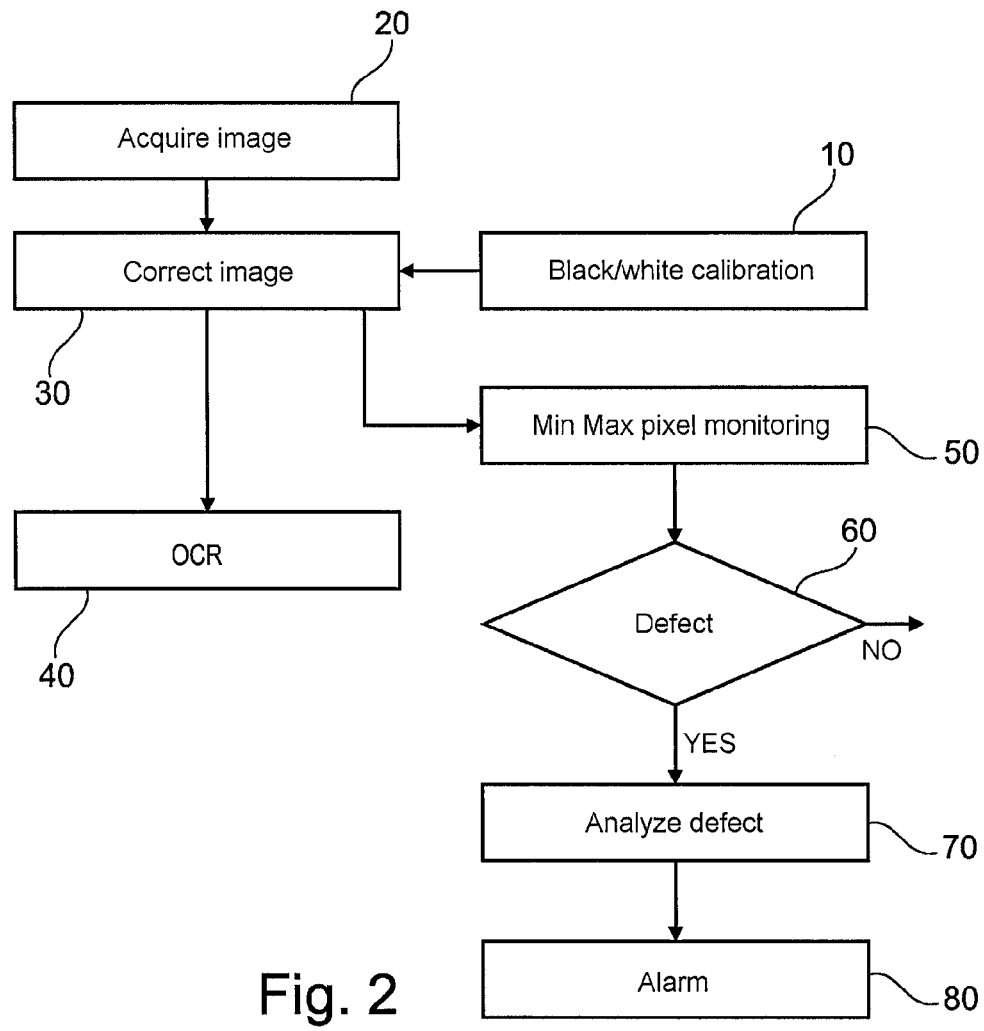
FIG. 2 is a flow chart showing the functions of the system for inspecting and monitoring the quality of the images.

FIG. 2 shows the method of processing the images in the facility 3 on the basis of a calibration step 10 for calibrating the black and white intensity levels as indicated above.

A digital image of a current mailpiece is thus taken by the camera 3 at 20. The pixels of said image are corrected at 30 on the basis of the linear correction coefficients calculated in step 10.

The corrected digital image is then delivered to an OCR process 40 for recognizing a delivery address, which process is implemented in the data processor unit, and after which process the sorting machine can direct the current mailpiece to a sorting outlet.

In parallel with the process 40, the corrected image of the mailpiece is delivered to an inspection/monitoring process for inspecting/monitoring the quality of the images, which process is represented by the block 50 and is implemented in the data processor unit.

In this inspection/monitoring process 50, intensity extrema are extracted from the pixels of the current image by scanning the image in the direction D, and any defect in the quality of the image is detected at 60 by analyzing said extrema. If a defect is detected at 60, the process continues by analyzing the defect at 70, followed by triggering a warning or an alarm at 80.

Figure 3:
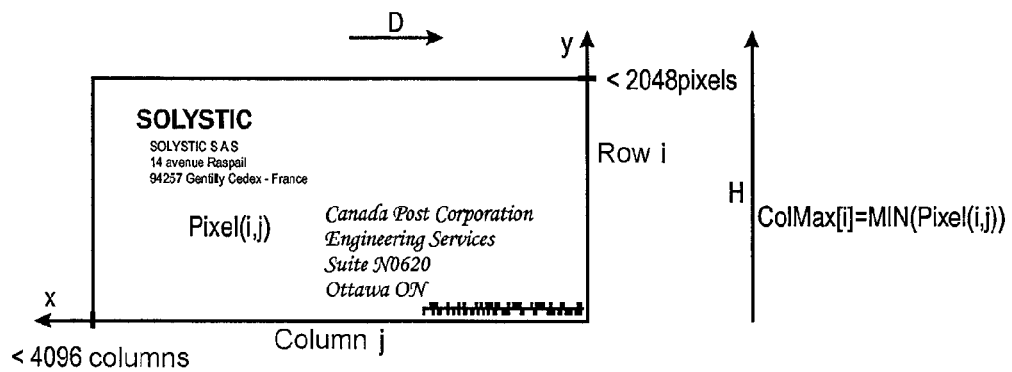
FIG. 3 shows the principle of extracting light intensity extrema from an image of the invention.

FIG. 3 shows scanning of the digital image for extracting the extrema. The size of the image over the height H of the mailpiece is a maximum of 2048 pixels in this example. The size of the image along the length L of the mailpiece (i.e. in the direction D) is a maximum of 4096 pixels in this example. The pixel of index (i,j) in the image is thus a pixel situated in a row i of the image and in a column j of the digital image. The principle of the monitoring of the invention is to extract from each image of a mailpiece a column vector of extrema of level of intensity indicated by MIN by scanning the entire length of the image in the direction D, which image includes both the background 7 of dark color and the face of the mailpiece 1. This function MIN consists in extracting from a scanning row i of pixels a pixel in a column j that presents the minimum intensity, i.e. a pixel of dark color. It can be understood that such a pixel is present at both ends of the image that correspond to the background of dark color 7. In practice, this column vector MIN must, over its entire height H, contain pixels of minimum intensity without contrast (level of saturation at 0) if the quality of the image is not degraded. In the invention, a column vector MIN is extracted from each image as the mailpieces go past the camera 3, and over an integration period that is sufficiently long, e.g. over 1000 consecutive images, and a recurrent anomaly over these vectors (e.g. the pixels in one or more rows of the vector are not at a level 0) is indicative of a degradation in the quality of the image produced by the acquisition system 3, e.g. due to the presence of dirt on the optical system (in particular on the protective glass window or the like) of the image acquisition system, such as a trace of adhesive.

Figure 4:
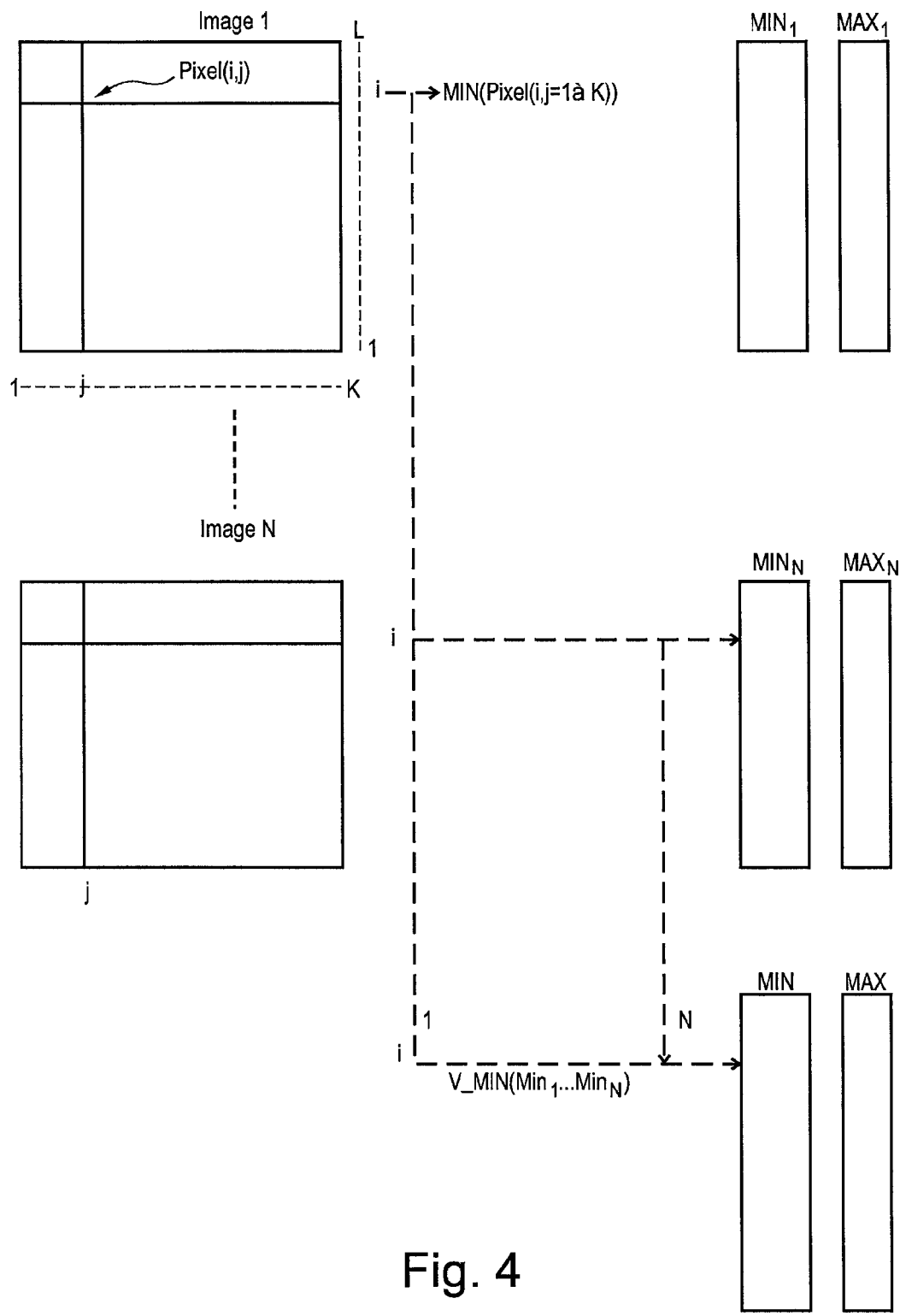
FIG. 4 diagrammatically shows the principle of detecting an anomaly by means of monitoring the light intensity extrema in the images.

FIG. 4 shows the principle of measurement for inspecting/monitoring the intensity extrema over a period of integration of N images. In FIG. 4, the column vector $MIN_1$ represents extraction of the minimum intensity pixels in all of the rows of the image 1 and the column vector $MIN_N$ represents extraction of the minimum intensity pixels in all of the rows of the image N. The column vector MIN (at the bottom of FIG. 4) represents extraction, over the period N of integration, of the minimum intensity pixels in all of the rows of the column vectors $MIN_1$ to $MIN_N$. It should be understood that, in this monitoring process, the MIN vector is reinitialized at each new period of integration of N images and degradation of the image acquisition system can thus be detected as the successive periods of integration proceed, whenever one or more pixels with light intensities different from the level of saturation at 0, e.g. at 10, appear in the column vector MIN. It is understood that, for reasons of real-time effectiveness, it is possible to compute each column vector $MIN_K$ for an image K with a sampling pitch p greater than 1 on the axis x of the image shown in FIG. 3.

The quality of the images produced by the image acquisition system can also be degraded by a calibration defect that is also used to detect and to distinguish relative to other types of defect.

In the invention, and as shown in FIG. 4, pixels of maximum intensity (level of intensity at 255 corresponding to white) are also extracted from all of the rows of the images from 1 to N in order to construct other column vectors represented by MAX1 . . . MAXN and MAX analogous to MIN1 . . . MINN and MIN, more particularly in the zone of the image that corresponds to the face of a mailpiece, the mailpiece generally being predominantly white. Degradation of the image acquisition system is then also detected in real time at 60 in FIG. 2 whenever one or more pixels with light intensities different from 255, e.g. 240, appear in said column vector MAX.

Analysis of the two column vectors MIN and MAX over the period of integration N makes it possible, in the process 70, to analyze the defect, e.g. on the basis of the decision table below.

In the decision table (Table 1) below, the threshold values indicated by threshold 1 and threshold 2 correspond substantially to the size of a speck of dust or to a trace of adhesive, i.e. about 1 mm, i.e. a few rows (e.g. threshold 1 and threshold 2 may be set at 8) in a column vector. The width of a contrast in a column vector is a parameter for distinguishing between a defect localized on the image (in the direction D) and a problem of calibration of the image acquisition system.

This table shows that in two situations indicated by "*", identification of the defect is ambiguous. This occurs when a batch of successive mailpieces all have a black slice over a period of integration. In order to distinguish this situation from a situation of a localized defect (presence of a speck of dust or of a trace of adhesive on the lens of the camera) it suffices to compare the column vector MAX of integration with the column vector MAXK constituted with the current image K. If the defects in both of the vectors have widths and depths (levels of intensity) that are similar, degradation in the quality of the image is detected, whereas if the defect in the vector MAXK is more pronounced than the defect in the vector MAX, this does not correspond to degradation of the image being detected.

Naturally, the invention may apply to other article image processing such as for banknotes and for bank checks, and the embodiments and implementations described are given merely by way of examples that are in no way limiting on the invention.

TABLE 1

| MIN | MAX | | |
| --- | --- | --- | --- |
|  | No defect detected | Defect width < threshold 1 | Defect width ≧ threshold 1 |
| No defect detected | Nominal quality | Localized defect or other defect* | Calibration problem or other problem* |
| Defect width < threshold 2 | Localized defect | Localized defect | Localized defect |
| Defect width ≧ threshold 2 | Calibration problem | Calibration problem | Calibration problem |

The invention claimed is:

1. An article-processing device comprising:
a conveyor for moving articles in series and on edge, a camera facing transversely relative to the conveyor so as to successively take a digital image of each article, a data processor unit for performing processing on the pixels of the digital image of the article and for inspecting/monitoring the quality of the successive digital images taken by the camera, wherein:
said conveyor has a back wall of a dark color and in front of which, relative to the camera, each article passes;
said camera is arranged to successively take a digital image of each article within which the article lies against a background corresponding to said back wall of the conveyor, said digital image including both said background and the face of the article; and
said data processor unit is arranged to scan rows of pixels in each digital image including pixels corresponding to said back wall in order to extract, for each scanned row, a pixel having a light intensity extremum,
said data processor unit further being arranged to extract, from the scanned rows of each successive digital image of an article, a column vector of extrema of level of intensity by scanning all the rows of a digital image, which digital image includes both said back wall and the face of the article,
said data processor unit further being arranged to measure said column vector of extrema of level of intensity from each successive digital image over a period of integration of N successive digital images,
said data processor unit further being arranged to extract, over said period of integration, a column vector representing the extrema intensity pixels in all of the rows of the column vectors of the successive digital images,
said data processor unit further being arranged to detect contrast among successive said extrema intensity pixels, such contrast being indicative of degradation of the quality of the digital images taken by the camera,
said data processor unit further being arranged to reinitialize said column vector representing the extrema intensity pixels at each new period of integration of N successive digital images.

2. A device according to claim 1, wherein said back wall is constituted by a face of a drive belt for driving the articles.

3. A device according to claim 1, wherein said data processing unit is arranged to scan rows of pixels of the digital image in such a manner as to extract, from each scanned row, a pixel presenting a minimum level of light intensity and a pixel presenting a maximum level of light intensity, and in that said pixels extracted from a plurality of digital images are used to detect any degradation in the quality of the digital images taken by the camera.

4. A device according to claim 1, wherein the articles are mailpieces.

5. A postal sorting machine including a device according to claim 1.

6. A method of inspecting/monitoring, over time, the quality of the digital images successively taken by a camera for an article-processing device, said method comprising the following steps:
successively taking digital images of one or more articles using the camera in such manner that each article lies within and against a back wall of dark color, said digital image including both said background and a face of the article, and recording said digital image in a memory of a data processor unit;
scanning rows of pixels in the digital image including pixels corresponding to said background in order to extract, for each scanned row, light intensity extrema from the pixels of the digital image;
extracting, from the scanned rows of each successive digital image of an article, a column vector of extrema of level of intensity by scanning all the rows of a digital image, which digital image includes both said back wall and the face of the article,
measuring said column vector of extrema of level of intensity from each successive digital image over a period of integration of N successive digital images,
extracting, over said period of integration, a column vector representing the extrema intensity pixels in all of the rows of the column vectors of the successive digital images,
analyzing said extrema and detecting, on the basis of a plurality of successive digital images, contrast among successive said extrema intensity pixels extracted from said successive digital images so as to identify any degradation in the quality of the digital images; and
reinitializing said column vector representing the extrema intensity pixels at each new period of integration of N successive digital images.

7. A method according to claim 6, wherein said scanning step includes scanning the rows of pixels of the digital image in such a manner as to extract, from each scanned line, a pixel presenting a minimum level of light intensity and a pixel presenting a maximum level of light intensity, and wherein said detecting step includes using said pixels extracted from a plurality of digital images to detect any degradation in the quality of the digital images taken by the camera.

* * * * *